Patented Dec. 10, 1935

2,023,995

UNITED STATES PATENT OFFICE 2,023,995

PROCESS FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application December 31, 1934, Serial No. 760,029

9 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent used in our process consists of an ester derived by reaction between a dibasic carboxy acid of the type $(CH_2)_n(COOH)_2$, in which $n$ has the value of at least five and not more than eight, and a hydroxylated fatty body, such as ricinoleic acid, triricinolein, hydroxystearic acid, diricinoleic acid, mono-olein, diolein, mono-ricinolein, and diricinolein, various blown oils, such as blown castor oil, blown rapeseed oil, hydroxylated fatty bodies derived by sulfation, etc.

More specifically, the dibasic carboxy acids employed to produce the reagent used as the demulsifying agent of our process, are the following:

Pimelic acid $(HOOC(CH_2)_5COOH.)$
Suberic acid $(HOOC(CH_2)_6COOH.)$
Azelaic acid $(HOOC(CH_2)_7COOH.)$
Sebacic acid $(HOOC(CH_2)_8COOH.)$ The reaction between such a dibasic carboxy acid and an hydroxylated fatty body, such as ricinoleic acid, is simply a matter of esterification with the elimination of water. For instance, if castor oil be represented by the formula

R.OH.COOH, then the reaction product may be described as follows:

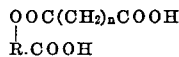

in which $n$ has its previous significance.

Similarly, if triricinolein be indicated by the formula:

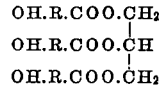

then apparently as many as three moles of a dibasic carboxy acid can unite with one mole of triricinolein in the manner previously described, or it is possible for one mole of the dibasic carboxy acid to unite with one mole of triricinolein so as to form a closed chain compound of the kind indicated by the following formula:

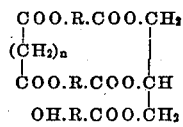

It is not necessary to remark that the remaining alcoholiform hydroxyl shown in the above formula might react with another mole of a dibasic carboxy acid, or with some other acid, such as phthalic acid, oleic acid, or ricinoleic acid. It is also apparent that if one employs a glycol derivative of ricinoleic acid, one might obtain a compound from these dibasic carboxy acids, which is characterized by the absence of a residual hydroxyl and also by the absence of a residual carboxyl. If a mole of triricinolein be reacted with one mole of a dibasic carboxy acid, of the kind described, so as to eliminate only one carboxy hydrogen, then the resultant ester is characterized by the presence of both a residual carboxyl and a residual hydroxyl radical. Such amphoteric ester for purposes of classification is considered as being within both the class of acid esters and also the class of basic esters.

For the sake of convenience, these esters derived from dibasic carboxy acids and characterized by the absence of a residual hydroxyl group, or a residual carboxyl group, will be referred to as the neutral ester. Those esters which are characterized by the presence of a residual carboxyl group, will be referred to as an acid ester. Similarly, those esters derived in a like manner and characterized by the presence of a hydroxyl group, will be referred to as basic esters.

It is not necessary that these specified dibasic carboxy acids be united to the hydroxylated fatty body by means of a hydroxyl group attached to the hydrocarbon chain, as in triricinolein, but they may also be united through the agency of a polyhydric alcohol residue replacing an acidic hydrogen of a carboxyl. For instance, olein, or more properly, triolein, may be designated by the following formula:

Thus, diolein may be represented by the following formula:

The dibasic carboxy acid may react with diolein and the resultant product indicated by the formula:

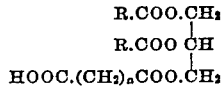

Similarly, derivatives can be obtained from mono-olein, and they may be of the closed chain type, or one might react a mole of mono-olein with one mole of a dibasic carboxy acid, so as to obtain a compound characterized by both a residual hydroxyl and a residual carboxyl radical. This is analogous to the amphoteric type previously mentioned and is considered as being both acidic and basic. It is understood, of course, that we may employ hydroxy derivatives of fatty acids and polyhydric alcohols other than glycerine. For instance, one might employ a derivative obtained from a glycol, for instance, a reaction product of one mole of oleic acid and one mole of ethylene glycol. One might employ derivatives obtained from polyglycerols. In view of the fact that it is well known that in many instances abietic acid, and naphthenic acids, act similarly to fatty acids, such as oleic acid, it is understood that these related acids, although not strictly fatty acids, are considered the equivalent thereof, after combination with a polyhydric alcohol, provided that there is a residual hydroxyl radical. As far as the manufacture of reagents for use as the demulsifying agent of our process is concerned, one could unite one mole of abietic acid or one mole of naphthenic acid with one mole of glycerine and subsequently combine this basic ester with one mole of a dibasic carboxy acid of the kind employed to produce a reagent of the kind employed in the present process. It is understood, of course, that any residual carboxyl may remain, as such, or may be replaced by any suitable metal, such as sodium, potassium, ammonium, calcium, magnesium, etc. Similarly, the acidic hydrogen may be replaced by any suitable organic radical, such as a methyl radical, ethyl radical, propyl radical, or a radical derived from an aryl, aralkyl, or cyclic alcohol. It is understood that the ammonium radical is considered as a metallic radical, and that the same is true of the radical derived from a basic amine, such as triethanolamine.

A residual hydroxyl radical may be neutralized in any suitable manner by any suitable acid, such as acetic acid, and particularly with a polybasic acid, such as phthalic acid, oxalic acid, etc.

The treating agent or demulsifying agent that we prefer to use in practising our process consists of acid sebacyl triricinolein. The expression "acid" is employed to indicate that only one carboxylic hydrogen is removed by esterification. This product is obtained simply by heating one mole of triricinolein (castor oil) with one mole of sebacic acid until one-half of the carboxylic hydrogen of the sebacic acid is eliminated. In the majority of cases we prefer to use the product without neutralization. If desired, the remaining carboxylic hydrogen may be neutralized with triethanolamine, thus yielding a salt. It is desirable to dilute with about 25%, by weight, of denatured or propyl alcohol.

The use of demulsifying agents consisting of various sulfo acids or carboxy acids, or a compound having both a sulfo group and a carboxyl group, or more than one carboxyl group, is well known in the treatment of water-in-oil emulsions. In the use of conventional demulsifying agents it is the common practice to use them not only in the form of acids, but also in the form of salts or esters, or half salts, or half esters, or ester salts, in the case of dibasic acids. Where such reagents have both a carboxylic hydrogen and a sulfonic hydrogen, it is well known that only the sulfonic hydrogen need be neutralized, if desired. The salts generally employed are the sodium salt, potassium salt, ammonium salt, calcium, magnesium, the triethanolamine salt, etc. The esters may be employed, such as the methyl ester, ethyl ester, propyl ester, butyl ester, amyl ester, hexyl ester, octyl ester, etc. Aromatic or cyclic esters may be employed. What has been said in regard to the use of conventional demulsifying agents applies also to the materials employed as the demulsifying agent of our process.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc. may be employed as diluents. Miscellaneous solvents, such as pine oil, carbon tetrachloride, sulfur dioxide extract obtained in the refining of petroleum, etc. may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water-solubility. Sometimes they may be used in a form which exhibits relatively limited water-solubility and relatively limited oil-solubility. However, since such reagents are sometimes used in a ratio of 1 to 10,000, or 1 to 20,000, or 1 to 30,000, such an apparent insolubility in oil and water is not significant, because said reagents undoubtedly have solubility within the concentration employed. This same fact is true in regard to the material or materials employed as the demulsifying agent of our process.

Although pimelic acid, suberic acid, azelaic acid and sebacic acid are derived by decomposition of ordinary fatty acids, or similar reactions, they are not considered members of the ordinary fatty acid group. The expression "fatty acid" or "fatty acid body" is herein employed to mean fatty acids of the ordinary type, such as oleic acid, ricinoleic acid, stearic acid, etc. with the qualification that under certain circumstances, previously described, naphthenic acids or abietic acid, may serve as a fatty acid. In the claims the expression "non-fatty" is used to characterize the dicarboxy acids so that they may clearly be distinguished from the fatty acids or fatty acid bodies which combine with a non-fatty dicarboxy acid, so as to produce the material which is employed as the demulsifying agent in the present process. As previously stated, the ester obtained may be employed as such, or converted into various salts, various more complex esters, etc.

In practising our process a treating agent or demulsifying agent of the kind above described is brought into contact with or caused to act upon the emulsion to be treated, in any of the various ways or by any of the various apparatus now generally used to resolve or break petroleum emulsions with a chemical reagent.

Having thus described our invention, what we claim as new and desire to secure by Letters Patent:

1. A process for breaking a petroleum emulsion of the water-in-oil type, which consists in subjecting the emulsion to the action of a demulsifying agent comprising an ester derived from a non-cyclic non-fatty dibasic carboxy acid of the type $(CH_2)_n(COOH)_2$, in which $n$ is at least five and not more than eight, and an hydroxylated fatty acid body.

2. A process for breaking a petroleum emulsion of the water-in-oil type, which consists in subjecting the emulsion to the action of a demulsifying agent comprising an ester derived from a non-cyclic non-fatty dibasic carboxy acid of the type $(CH_2)_n(COOH)_2$, in which $n$ is at least five and not more than eight, and an hydroxylated fatty acid body, said demulsifying agent being further characterized by the fact that the esterification reaction involved a polyhydric alcohol residue substituted in the fatty carboxylic hydrogen position.

3. A process for breaking a petroleum emulsion of the water-in-oil type, which consists in subjecting the emulsion to the action of a demulsifying agent comprising an ester derived from a non-cyclic non-fatty dibasic carboxy acid of the type $(CH_2)_n(COOH)_2$, in which $n$ is at least five and not more than eight, and an hydroxylated fatty acid body, said demulsifying agent being further characterized by the fact that the esterification reaction involved an alcoholiform hydroxyl attached to the fatty hydrocarbon chain.

4. A process for breaking a petroleum emulsion of the water-in-oil type, which consists in subjecting the emulsion to the action of a demulsifying agent in the form of a neutral ester, comprising an ester derived from a non-cyclic non-fatty dibasic carboxy acid of the type $(CH_2)_n(COOH)_2$, in which $n$ is at least five and not more than eight, and an hydroxylated fatty acid body, said demulsifying agent being further characterized by the fact that the esterification reaction involved an alcoholiform hydroxyl attached to the fatty hydrocarbon chain.

5. A process for breaking a petroleum emulsion of the water-in-oil type, which consists in subjecting the emulsion to the action of a demulsifying agent in the form of an acid ester, comprising an ester derived from a non-cyclic non-fatty dibasic carboxy acid of the type $(CH_2)_n(COOH)_2$, in which $n$ is at least five and not more than eight, and an hydroxylated fatty acid body, said demulsifying agent being further characterized by the fact that the esterification reaction involved an alcoholiform hydroxyl attached to the fatty hydrocarbon chain.

6. A process for breaking a petroleum emulsion of the water-in-oil type, which consists in subjecting the emulsion to the action of a demulsifying agent in the form of a basic ester, comprising an ester derived from a non-cyclic non-fatty dibasic carboxy acid of the type $(CH_2)_n(COOH)_2$, in which $n$ is at least five and not more than eight, and an hydroxylated fatty acid body, said demulsifying agent being further characterized by the fact that the esterification reaction involved an alcoholiform hydroxyl attached to the fatty hydrocarbon chain.

7. A process for breaking a petroleum emulsion of the water-in-oil type, which consists in subjecting the emulsion to the action of a demulsifying agent in the form of an acid ester, comprising an ester derived from a non-fatty dibasic carboxy acid of the type $(CH_2)_n(COOH)_2$, in which $n$ is at least five and not more than eight, and castor oil.

8. A process for breaking a petroleum emulsion of the water-in-oil type, which consists in subjecting the emulsion to the action of a demulsifying agent comprising acid sebacyl ricinolein.

9. A process for breaking a petroleum emulsion of the water-in-oil type, which consists in subjecting the emulsion to the action of a demulsifying agent obtained by reacting one mole of triricinolein with one mole of sebacic acid until one-half of the carboxylic hydrogen of the sebacic acid is eliminated, and diluting with a suitable alcohol.

MELVIN DE GROOTE.
BERNHARD KEISER.